UNITED STATES PATENT OFFICE.

WM. BAKER, OF SHEFFIELD, ENGLAND.

IMPROVEMENT IN THE MANUFACTURE OF WHITE LEAD.

Specification forming part of Letters Patent No. 48,243, dated June 13, 1865.

*To all whom it may concern:*

Be it known that I, WILLIAM BAKER, of Sheffield, in the county of York, Great Britain, have invented a more economical and efficient mode of producing White Lead than is effected by those methods hitherto adopted, of which the following is a specification.

My invention consists in substituting for acetic acid, as now used in the Dutch method for the manufacture of white lead, salts of acetic acid, from which acid acetic may be produced or liberated by the employment of either sulphuric acid, or hydrochloric acid, or mixtures thereof, or by the employment of the acid sulphates of the alkalies. The acetates which I have found to answer for this purpose are the acetates of lime, acetates of soda, and the soluble acetates of the alkalies, and the alkaline earths, or others of a like nature. To any of the before-mentioned acetates I add a chemical equivalent of or a slight excess of sulphuric acid, or of hydrochloric acid, or of mixtures thereof, or of the bisulphates of soda or potass in sufficient quantity to set free all the acetic acid previously combined with the base. The salts or compounds thus resulting from the decomposition of the soluble acetates, which in the case of acetate of lime and sulphuric acid is sulphate of lime, or when acetate of lime and hydrochloric acid have been employed, then chloride of calcium, have the effect of retarding the evaporation of the liberated acetic acid.

I have obtained good results from a mixture containing about two per cent. of anhydrous acetic acid, and composed of thirty-seven pounds of commercial acetate of lime, containing ninety per cent. of the salt, twenty-five pounds of sulphuric acid, containing seventy-eight per cent. of acid, and one hundred and twenty gallons of water; or, when hydrochloric acid is employed, then one hundred and three pounds of hydrochloric acid, containing thirty per cent. of acid; or, in the case of bisulphate of soda, a quantity representing ninety-one pounds of crystallized bisulphate of soda, or an equivalent proportion of bisulphate of potass. The strength of the mixture, however, may be varied at pleasure.

I do not confine myself to any of the before-mentioned mixtures, as any mixture can be employed that produces acetic acid, which acetic acid so liberated can be evaporated from its solution by the action of the heat generated by the fermentation of tan in the stacks, either aided or not by the introduction or application of artificial heat.

In order to retard the evaporation of acetic acid when employed, as at present, in the ordinary Dutch method of the manufacture of white lead above mentioned, I add to the acetic acid intended to be employed for that purpose certain salts, such as sulphate of lime, sulphate of soda, or common salt, or any neutral salt.

What I claim as my invention, and desire to secure by Letters Patent, is—

The substitution, for acetic acid as now used in the Dutch method for the manufacture of white lead, of salts of acetic acid, from which acetic acid may be produced or liberated by the employment of either sulphuric acid or hydrochloric acid or mixtures thereof, or by the employment of the acid sulphates of the alkalies.

WILLIAM BAKER.

Witnesses:
  W. M. PICKSLAY,
  R. M. STEVENSON.